G. E. KING.

Trimming.

No. 6,518. Reissued June 29, 1875.

Witnesses.

Alex E Kurshurst

Thos. Miller

Inventor

Geo E King

Fred A Kurshuck assignee

THE GRAPHIC CO. PHOTO-LITH 39 & 41 PARK PLACE, N.Y.

UNITED STATES PATENT OFFICE.

GEORGE E. KING, OF NEW YORK, N. Y., ASSIGNOR TO FREDERIC A. KURSHEEDT, OF SAME PLACE.

IMPROVEMENT IN TRIMMINGS.

Specification forming part of Letters Patent No. 62,492, dated February 26, 1867; reissue No. 3,001, dated June 23, 1868; reissue No. 6,518, dated June 29, 1875; application filed April 20, 1875.

*To all whom it may concern:*

Be it known that I, GEORGE EDWIN KING, of the city, county, and State of New York, have invented a new and improved article of manufacture, which I term Puffing; and that the following, taken in connection with the drawings, is a full, clear, and exact description thereof.

Figure 1:
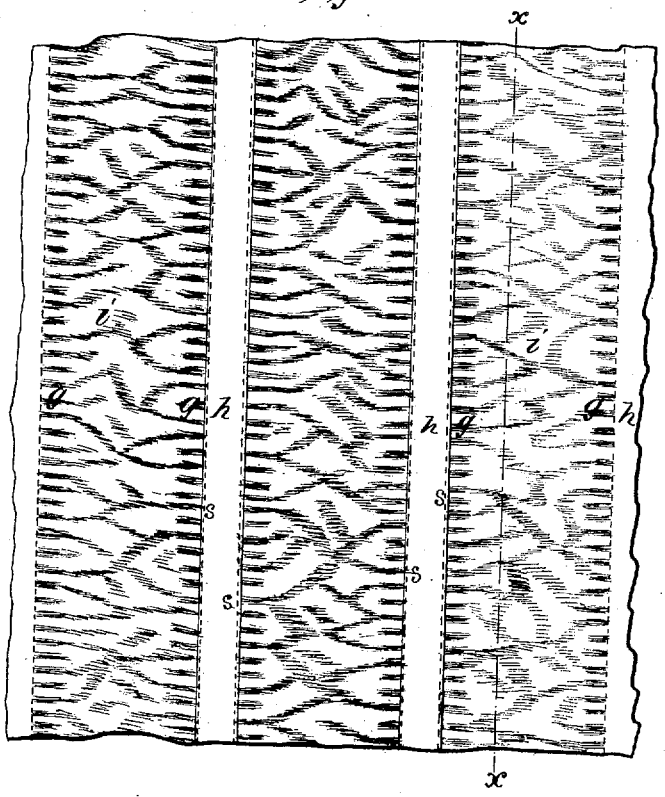
Figure 2:
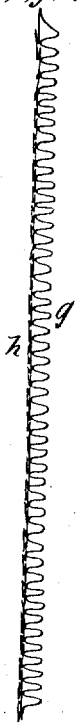
Figure 3:
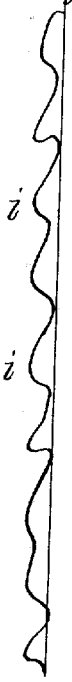

In the drawings, Figure 1 is a top view or plan of my improved puffing. Fig. 2 is an outside edge view or elevation of the flattened border and the fluting, making part of the whole article. Fig. 3 is a section through a strip of the article, on the line *x x* of Fig. 1.

This puffing is manufactured from muslin or other fabric, and is suitable for use in shirt-bosoms, for trimmings, and for other purposes of dress.

It may be made in single strips, or, when the material is of sufficient width, of a series of strips, side by side, which has some additional advantages and uses. This series may afterward be divided into single strips by cutting the same through the flattened portions. If deemed necessary, tapes or narrow strips of goods may be stitched or sewed along the flattened portions, or such portions may be simply stitched with tapes or strips basted near the edges of each strip. The single article, when finished, is composed of five rows or lines of conformation, each row extending through the length of a strip, and each row differing in contour of surface from that which lies adjacent to it. The utility of the puffing as an article of manufacture depends principally upon the specific contour of these lines of conformation, and their striking contrast with each other. The two outer rows of each strip are made of material gathered or plaited, the plaits being flattened upon each other, or nearly so, the conformation being substantially the same as that of the head, or part fixed or adjacent to the band of an ordinary plaited ruffle; this plaiting or gathering being like that formed by hand with a knife, or by machines known as ruffling, plaiting, or gathering machines. The effect of these two outer rows is, of flat strips more or less gathered or plaited, but without any marked projection upon their surfaces. These rows of flattened plaiting are shown at *h h* in the drawings. Next to these rows of flattened plaiting, and on the sides thereof nearest the center of the strip, are two rows of fluting, (shown at *g g*,) which are composed of regular flutes, such as are made by a fluting-machine, such as are now in use, and which are usually composed of two corrugated rollers, the salient parts of the flutes of one roller meshing into the depressed portions of the flutes of the other roller. This fluting is a regular and very marked series of corrugations or regular elevations and depressions, substantially like the channels or grooves formed in fluted columns, and presents an entirely different appearance to the eye, and also an entirely different configuration of surface, and an entirely different longitudinal section from a row of plaits. Fig. 2 clearly shows this difference in section. The material of which the article is made is necessarily shortened in length by the plaiting or fluting. The center of the strip cannot, therefore, lie flat, or present a plain surface, but becomes puffy or irregularly wrinkled, and the fifth or center row of the strip is, therefore, puffy or wrinkled.

Each strip of the new article of manufacture has two rows of flattened plaiting, one on each edge; two rows of fluting, one inside of each row of plaiting, and one row of puffed or wrinkled surface in the center and between the two rows of fluting. In order to keep each strip in shape a row of stitches may be formed in each row of plaiting.

This new article of manufacture may be most readily manufactured by the use of the machine invented by me, and described in Letters Patent of the United States No. 62,492, dated February 26, 1867, and since reissued and dated June 23, 1868.

The article manufactured on this machine will have a fullness in the central line of configuration of each series of rows greater than that produced by the fluting or gathering of the fabric merely, for the reason that material will be drawn in laterally by the curved guide with which said machine is provided.

I am aware of the fact that an article of manufacture has been made which may be termed a double-headed ruffle—that is to say, an article composed of two rows of plaiting or gathering, one on each side, with a wrinkled or puffed surface between the two rows of gathers; but this article had no rows of fluting such as above described.

I do not claim a fluted strip or a plaited head with puffing bordering thereon, or a strip with two plaited edges and puffs between, or a strip with an inner plaited edge, and the other edge and center fluted; but I do claim—

1. The new article of manufacture herein described, consisting of two rows of plaiting, two of fluting, and one of puffing, arranged with reference to each other as described.

2. The new article of manufacture consisting of the combination or arrangement on one piece of fabric of a series of two or more strips of fluted puffing, substantially as described, each of such strips consisting of two rows of plaiting, two of fluting, and one of puffing, arranged with reference to each other as described.

3. The new article of manufacture consisting of the combination or arrangement on one piece of fabric of a series of two or more strips of fluted puffing, substantially as described, each of such strips consisting of two rows of plaiting, two of fluting, and one of puffing, arranged with reference to each other as described, the flattened or plaited rows between such strips being defined and stiffened by tapes or narrow strips of goods stitched along such flattened portions.

4. A strip of muslin or other fabric having a row of plaiting on each edge, and on the inner side of each of said rows a row of fluting, the said rows of fluting being separated from each other by puffed, gathered, wrinkled, or wavy material, and the four rows being arranged with reference to each other as described.

5. A piece of muslin or other fabric having two rows of flattened gathering or plaiting, and two of fluting, bordering upon a strip having a fullness greater than that produced merely by the fluting or gathering of the fabric, substantially as described.

GEO. E. KING.

Witnesses:

ALEX. E. KURSHEEDT,
THOS. MILLER.